Nov. 11, 1947.　　　G. E. DATH　　　2,430,495
HAND BRAKE
Filed Feb. 16, 1946

Inventor:
George E. Dath.
By Henry Fuchs
Atty.

Patented Nov. 11, 1947

2,430,495

UNITED STATES PATENT OFFICE 2,430,495

HAND BRAKE

George E. Dath, Mokena, Ill., assignor to W. H. Miner, Inc., Chicago, Ill., a corporation of Delaware Application February 16, 1946, Serial No. 648,167

6 Claims. (Cl. 188—81.1)

This invention relates to improvements in hand brakes for railway cars.

One object of the invention is to provide a hand brake mechanism of the power multiplying, gear operated type, comprising a ratchet wheel and a cooperating pivoted locking dog for holding the brake mechanism against movement in brake releasing direction, wherein lever operated means is provided for actuating the dog to force the same into and withdraw it from engagement with the ratchet wheel.

A more specific object of the invention is to provide a hand brake mechanism as specified in the preceding paragraph, wherein the lever operated means for actuating the dog comprises a link pivoted at one end and having shouldered engagement with the dog and actuated by a swingable lever pivoted to the other end thereof having camming engagement with a fixed abutment element to lift the dog out of engagement with the ratchet wheel when swung in one direction, and engageable with the dog when swung in a reverse direction to force the dog toward the ratchet wheel and into engagement therewith.

Other objects of the invention will more clearly appear from the description and claims hereinafter following.

Figure 1:
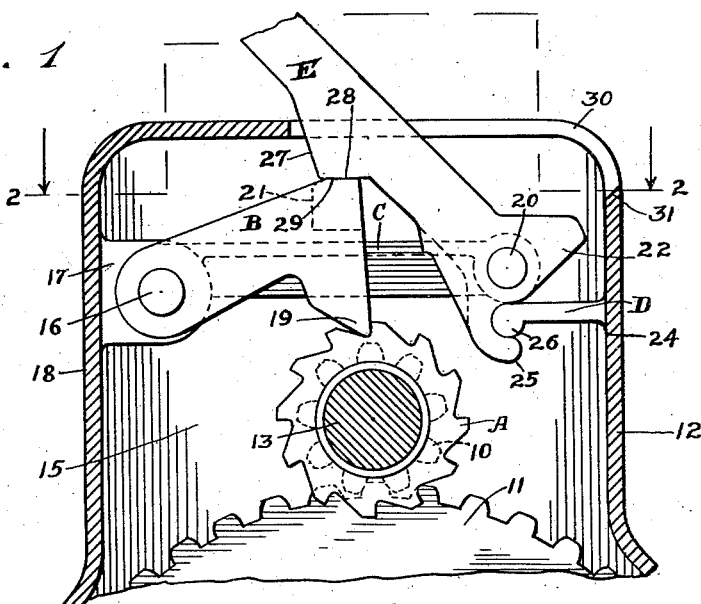
Figure 2:
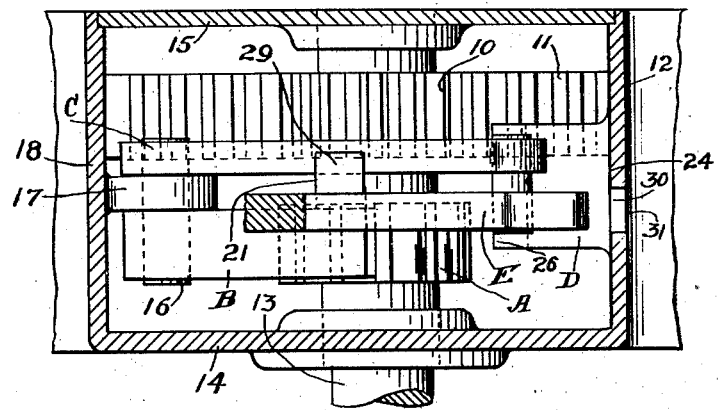
Figure 3:
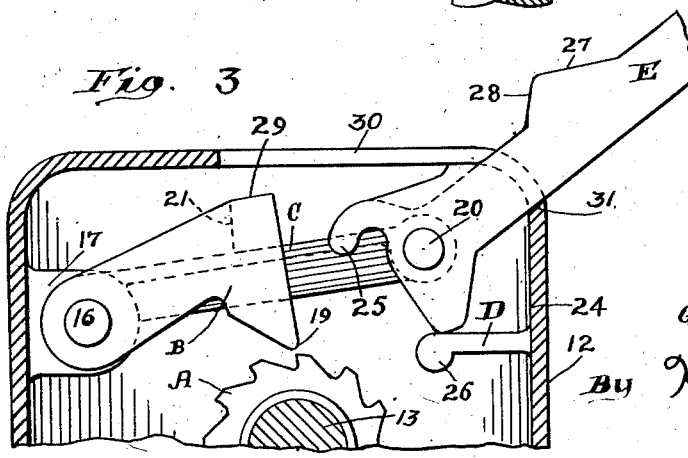

In the drawing forming a part of this specification, Figure 1 is a transverse, vertical sectional view, partly broken away, of the upper end portion of a gear operated hand brake mechanism, illustrating my improvements in connection therewith. Figure 2 is a horizontal sectional view, corresponding substantially to the line 2—2 of Figure 1, the top wall of the housing being omitted. Figure 3 is a view, similar to Figure 1, showing the pivoted dog disengaged from the ratchet wheel.

As illustrated in the drawing, my improvements are employed in connection with a well-known type of power multiplying, gear operated brake, employing the usual brake drum on which the chain is wound, the drum being rotated by a driving pinion 10, actuated by the hand wheel, not shown, and meshing with the gear wheel 11, which is rotatable with the winding drum. The parts of the mechanism are contained in the usual housing, which is indicated by 12.

My improved mechanism comprises broadly a ratchet wheel A, rotatable with the driving pinion of the power multiplying, gear operated brake; a pivoted locking dog B cooperating with the ratchet wheel; a pivoted link C engageable with the dog to lift the same out of engagement with the ratchet wheel; a fixed abutment or stop member D; and an operating lever E having camming engagement with the fixed abutment to actuate the dog.

The ratchet wheel A is of the usual type and is fixed to the shaft 13, which also has the pinion 10 fixed thereto, and is actuated by the usual hand wheel, not shown, which is located on the shaft exteriorly of the housing. The shaft 13 has its opposite ends journaled in the usual manner in the front and rear walls 14 and 15 of the housing.

The locking dog B is swingingly supported above the ratchet wheel, being pivoted at its inner end on a pin 16 extending through a laterally inwardly projecting lug 17 on the inner side of the left hand side wall 18 of the housing A, as seen in Figure 1. At its outer end, the dog B is provided with a depending tooth 19, which engages the teeth of the ratchet wheel A.

The link C is in the form of an elongated bar swingingly supported at its left hand end, as seen in Figures 1 and 3, on the pivot 16. As clearly shown in Figure 2, the link C and the dog B are located at opposite sides of the pivot pin supporting lug 17 and the link C extends parallel to the dog. As shown, the link C is considerably longer than the dog B and has the lever E pivoted to the outer or right hand end thereof, the lever E being swingingly supported on a pivot pin 20 extending through the outer end of said link. At the outer end, on the side thereof adjacent the link C, the dog B is provided with a laterally projecting lug 21, which overhangs the link C. As will be evident, inasmuch as the lug 21 is in the path of upward swinging movement of the link C, the dog B will be lifted by the link when the latter is swung upwardly.

The lever E, which, as hereinbefore stated, is pivoted to the link C, has a cam projection 22 at its pivoted end adapted to ride on the abutment D, which is in the form of a horizontal shelf extending laterally inwardly from the right hand side wall 24 of the housing, as seen in Figures 1 and 3. At the edge opposite to the cam projection 22, the pivoted end portion of the lever E is further provided with a hook member 25 engageable with the rounded edge portion or bead 26 of the end of the shelf, as shown in Figure 1, for a purpose hereinafter stated. Above the pivot thereof, the lever E has a laterally projecting enlargement 27, which is on the same side of the lever as the hook 25. As shown in Figure 2, the lever is laterally spaced with respect to the link C so as to engage over the dog B, and the enlargement 27 of the lever is provided with a flat underneath abutment face or shoulder 28, adapted to engage a corresponding flat abutment face or shoulder 29 at the upper side of the outer end of the dog B.

The lever E as shown in Figures 2 and 3, extends through a slot 30 in the top portion of the housing and is limited in its swinging movement to the right by the end wall 31 of said slot against which it shoulders, as shown in Figure 3.

With the lever E in the position shown in Figure 1, resting against the abutment face or shoulder 28 of the dog B, the weight of the lever yieldingly holds the dog engaged with the ratchet wheel A, and upon rotation of the ratchet wheel in clockwise direction, as seen in Figure 1, in tightening the brakes, the dog ratchets over the teeth of the ratchet wheel in the usual manner. When the brakes have been applied, the dog holds the same against release by engagement with the teeth of the ratchet wheel, as illustrated in Figure 1. To release the brakes, the lever E is swung to the right from the position shown in Figure 1 to the position shown in Figure 3. As the lever is thus swung to the right, the same is forced upwardly by riding of the cam projection 22 on the shelf D, swinging the link C upwardly about its pivot 16 and lifting the dog B out of engagement with the ratchet wheel by engagement of the link with the lug 21 of the dog, as illustrated in Figure 3.

To operatively engage the dog B with the ratchet wheel A, the lever E is swung to the left from the position shown in Figure 3 to that shown in Figure 1. During this swinging movement of the lever, the hook 25 is engaged with the bead 26 of the shelf D and the shoulder or abutment face 28 of the lever engages the top side of the dog, forcing the same toward the ratchet wheel and into engagement with the teeth thereof. As will be evident, engagement of the hook 25 of the lever E with the bead of the shelf D prevents bodily movement of the lever E in upward direction at the time that the tooth of the dog B is being forced into engagement with the teeth of the ratchet wheel, thus making this action positive. After the dog has been thus engaged, it is yieldingly maintained in operative engagement by the weight of the overbalanced lever E.

I claim:

1. In a hand brake, the combination with a member adapted to be rotated to effect tightening of the brake; of a ratchet wheel rotatable with said member; a locking dog having ratcheting engagement with said wheel, said dog being pivoted at one end and having a tooth at the other end engageable with said ratchet wheel; and means for disengaging said dog from the ratchet wheel comprising a link pivoted at one end for swinging movement, a lever having engagement with the other end of said link for lifting the same, and a fixed abutment, said lever having camming engagement with said abutment to swing said link upwardly, and said link having shouldered engagement with the dog to lift the latter and swing it on its pivot away from the ratchet wheel.

2. In a hand brake, the combination with a member adapted to be rotated to effect tightening of the brake; of a ratchet wheel rotatable with said member; a locking dog having ratcheting engagement with said wheel, said dog being pivoted at one end and having a tooth at the other end engageable with said ratchet wheel; and means for disengaging said dog from the ratchet wheel comprising a link pivoted at one end for swinging movement, and a lever pivoted to the other end of said link for swinging movement toward said dog, said lever having shouldered engagement with the dog to swing the same against the ratchet wheel.

3. In a hand brake, the combination with a member adapted to be rotated to effect tightening of the brake; of a ratchet wheel rotatable with said member; a locking dog having ratcheting engagement with said wheel, said dog being pivoted at one end and having a tooth at the other end engageable with said ratchet wheel; and means for disengaging said dog from the ratchet wheel comprising a link pivoted at one end for swinging movement, a lever pivoted to the other end of said link for swinging movement toward and away from said dog, said lever, when swung toward said dog, engaging the latter to swing the same into engagement with said ratchet wheel, a fixed abutment, cam means on said lever engaging said fixed abutment, said cam means having camming engagement with said abutment when the lever is swung away from said dog to swing said link upwardly about its pivotal axis, and a lug on said dog in the path of upward swinging movement of said link and engageable by the latter to lift said dog out of engagement with the ratchet wheel.

4. In a hand brake, the combination with a member adapted to be rotated to effect tightening of the brake; of a ratchet wheel rotatable with said member; a locking dog having ratcheting engagement with said wheel; a pivot member supporting said dog at one end for swinging movement toward and away from said ratchet wheel, said dog having a tooth at the other end engageable with said ratchet wheel; a fixed abutment element; a link swingingly supported at one end on said pivot member; a lug on the toothed end of said dog overhanging said link and in the path of upward swinging movement of the same; a lever pivoted to the other end of said link for swinging movement toward and away from said dog; and a cam projection on the pivoted end of said lever having camming engagement with said abutment member when the lever is swung away from said dog to swing said link upwardly against the lug of the dog and lift the latter out of engagement with the ratchet wheel.

5. In a hand brake, the combination with a member adapted to be rotated to effect tightening of the brake; of a ratchet wheel rotatable with said member; a locking dog having ratcheting engagement with said wheel; a pivot member supporting said dog at one end for swinging movement toward and away from said ratchet wheel, said dog having a tooth at the other end engageable with said ratchet wheel; a link swingingly supported at one end on said pivot member; and a lever pivoted to the other end of said link for swinging movement toward and away from said dog, said lever, when swung toward said dog, engaging the toothed end of the latter to force the same against said ratchet wheel.

6. In a hand brake, the combination with a member adapted to be rotated to effect tightening of the brake; of a ratchet wheel rotatable with said member; a locking dog having ratcheting engagement with said wheel; a pivot member supporting said dog at one end for swinging movement toward and away from said ratchet wheel, said dog having a tooth at the other end engageable with said ratchet wheel; a fixed stop projection; a link swingingly supported at one end on said pivot member; a lever pivoted to the other end of said link for swinging movement toward and away from said dog; and a hook member on said lever engageable with said fixed stop projection, said lever, when swung toward said dog, engaging the toothed end of the latter to force the same into engagement with said ratchet wheel and bringing the hook member of said lever into holding engagement with said stop projection.

GEORGE E. DATH.

REFERENCES CITED

The following references are of record in the file of this patent:

UNITED STATES PATENTS

| Number | Name | Date |
|---|---|---|
| 1,950,477 | Burnett | Mar. 13, 1934 |
| 1,980,686 | Kinsman | Nov. 13, 1934 |